(12) United States Patent
Matsuda et al.

(10) Patent No.: US 11,888,103 B2
(45) Date of Patent: Jan. 30, 2024

(54) SEPARATOR-INTEGRATED GASKET

(71) Applicant: NOK CORPORATION, Tokyo (JP)

(72) Inventors: Taisuke Matsuda, Fujisawa (JP); Shigeru Watanabe, Fujisawa (JP)

(73) Assignee: NOK CORPORATION

(*) Notice: Subject to any disclaimer, the term of this patent is extended or adjusted under 35 U.S.C. 154(b) by 330 days.

(21) Appl. No.: 17/439,837

(22) PCT Filed: Mar. 24, 2020

(86) PCT No.: PCT/JP2020/012908
§ 371 (c)(1),
(2) Date: Sep. 16, 2021

(87) PCT Pub. No.: WO2020/209047
PCT Pub. Date: Oct. 15, 2020

(65) Prior Publication Data
US 2022/0093940 A1 Mar. 24, 2022

(30) Foreign Application Priority Data
Apr. 9, 2019 (JP) ................. 2019-074231

(51) Int. Cl.
*H01M 8/0228* (2016.01)
*H01M 8/0206* (2016.01)
*H01M 8/0247* (2016.01)
*H01M 8/0258* (2016.01)
*H01M 8/0276* (2016.01)

(52) U.S. Cl.
CPC ....... *H01M 8/0228* (2013.01); *H01M 8/0206* (2013.01); *H01M 8/0247* (2013.01); *H01M 8/0258* (2013.01); *H01M 8/0276* (2013.01)

(58) Field of Classification Search
None
See application file for complete search history.

(56) References Cited

U.S. PATENT DOCUMENTS

2017/0279133 A1  9/2017  Blunt et al.
2018/0175403 A1*  6/2018  Lim .................... H01M 8/0267

FOREIGN PATENT DOCUMENTS

| JP | 2010-129459 A | 6/2010 |
| JP | 2010-272474 A | 12/2010 |
| JP | 2017-532731 A | 11/2017 |
| KR | 10-2010-0030709 A | 3/2010 |
| KR | 10-2013-0057716 A | 6/2013 |
| WO | 2013-077488 A1 | 5/2013 |
| WO | 2016-042376 A1 | 3/2016 |
| WO | WO 2020/209047 | * 10/2020 |

OTHER PUBLICATIONS

International Search Report (English and Japanese) of the International Searching Authority issued in PCT/JP2020/012908, dated Jun. 23, 2020; ISA/JP (5 pages).

* cited by examiner

*Primary Examiner* — Alix E Eggerding
(74) *Attorney, Agent, or Firm* — Harness, Dickey & Pierce, P.L.C.

(57) ABSTRACT

A separator-integrated gasket is provided for making an electrolyte membrane unlikely to be deformed when a stack is assembled. The separator-integrated gasket for a fuel battery includes a lip-shaped gasket, first and second separator components, and a flat-shaped gasket. The first and second separator components are made of press-workable metal plates, and include first and second three-dimensional shape portions, respectively. The first separator component includes a surface that is on a side opposite to a protruding direction of the first three-dimensional shape portion and on which a gasket attachment groove holding the lip-shaped gasket is formed. The second separator component includes a surface that is on a side opposite to a protruding direction of the second three-dimensional shape portion and on which a three-dimensional shape fitting groove accommodating the first three-dimensional shape portion is formed. The flat-shaped gasket is held on an outer surface side at the second three-dimensional shape portion. The first and second three-dimensional shape portions protrude in the same direction while mutually adjusted in positions on a flat surface. The first and second separator components are joined to each other while superposed over each other in a thickness direction.

7 Claims, 13 Drawing Sheets

SEPARATOR-INTEGRATED GASKET

CROSS REFERENCE TO RELATED APPLICATIONS

This application is a U.S. National Phase Application under 35 U.S.C. 371 of International Application No. PCT/JP2020/012908, filed on Mar. 24, 2020, which claims priority to Japanese Patent Application No. 2019-074231, filed on Apr. 9, 2019. The entire disclosures of the above applications are expressly incorporated by reference herein.

BACKGROUND

Technical Field

The present invention relates to a separator-integrated gasket.

Related Art

A gasket for sealing reactants ($O_2$ and $H_2$) and cooling water, for example, is assembled integrally to a separator. Thereby, a separator-integrated gasket for a fuel battery is configured. The separator is a constituent element of a fuel cell.

A press-workable metal bipolar separator is sometimes used as the separator in order to reduce cost of groove processing for a gasket forming portion and a flow path portion (e.g., Japanese Patent Application Laid-open Publication No. 2017-532731).

Meanwhile, a double-sided gasket is sometimes used as the gasket in order to permit positions of separators to be deviated from each other on its flat surface. The separators are layered over each other at the time of stack assembling. The double-sided gasket is constituted by a lip-shaped gasket and a flat-shaped gasket.

When a press-workable metal bipolar separator is used in combination with a double-sided gasket constituted by a lip-shaped gasket and a flat-shaped gasket, the following points are noted.

The lip-shaped gasket includes a gasket base portion and a seal lip. The seal lip is provided integrally on a flat surface of the gasket base portion. The flat-shaped gasket is a flat one without a seal lip. Accordingly, a height (thickness) of the lip-shaped gasket is larger than a height (thickness) of the flat-shaped gasket.

A difference in height (thickness) between the lip-shaped gasket and the flat-shaped gasket causes an electrolyte membrane to be deformed as a result of being lifted to one side in a thickness direction by the lip-shaped gasket. The thus-deformed electrolyte membrane is pinched between the two gaskets at the time of stack assembling. Such deformation can influence durability of the electrolyte membrane.

An object of the present invention is to provide a separator-integrated gasket by which an electrolyte membrane is unlikely to be deformed at the time of stack assembling.

SUMMARY

A separator-integrated gasket for a fuel battery according to the present invention includes:
  a lip-shaped gasket;
  a first separator component made of a press-workable metal plate and including a first three-dimensional shape portion, the first separator component including a surface that is on a side opposite to a protruding direction of the first three-dimensional shape portion and on which a gasket attachment groove is formed, the gasket attachment groove holding the lip-shaped gasket;
  a second separator component made of a press-workable metal plate and including a second three-dimensional shape portion, the second separator component including a surface that is on a side opposite to a protruding direction of the second three-dimensional shape portion and on which a three-dimensional shape fitting groove is formed, the three-dimensional shape fitting groove accommodating the first three-dimensional shape portion; and
  a flat-shaped gasket held on an outer surface side at the second three-dimensional shape portion,
  wherein the first three-dimensional shape portion and the second three-dimensional shape portion protrude in the same direction while mutually adjusted in positions on a flat surface, and
  the first separator component and the second separator component are joined to each other while superposed over each other in a thickness direction.

Advantageous Effects

The separator-integrated gasket according to the present invention can suppress deformation of an electrolyte membrane at the time of stack assembling.

DETAILED DESCRIPTION

Figure 1:
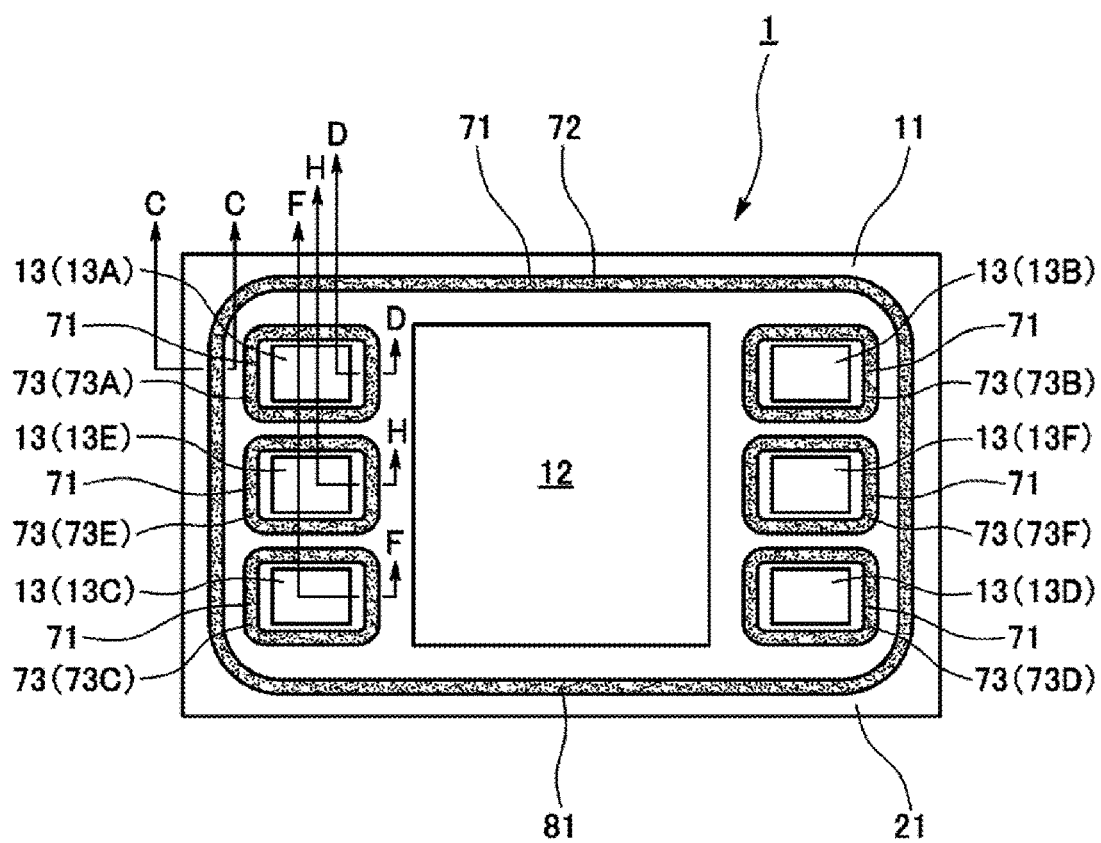
FIG. 1 is a plan view of a separator-integrated gasket of an embodiment.

A separator-integrated gasket 1 according to an embodiment includes a separator 11 and a gasket 71 as illustrated in FIG. 1. The separator 11 includes a flat surface having a rectangular shape. The gasket 71 is assembled integrally to the separator 11.

The separator 11 includes a reaction surface 12 for reactants ($O_2$ and $H_2$), and includes manifold holes 13. The reaction surface 12 is positioned at a center in the flat surface of the separator 11. The manifold holes 13 include a manifold hole 13A for oxygen ($O_2$) supply, a manifold hole 13B for oxygen ($O_2$) discharge, a manifold hole 13C for hydrogen ($H_2$) supply, a manifold hole 13D for hydrogen ($H_2$) discharge, a manifold hole 13E for cooling water supply, and a manifold hole 13F for cooling water discharge. The supply manifold holes 13A, 13C, and 13E and the discharge manifold holes 13B, 13D, and 13F are arranged on both sides of the reaction surface 12 so as to sandwich the reaction surface 12.

The gasket 71 includes an outer surround seal portion 72 and manifold seal portions 73. The outer surround seal portion 72 is provided along an outer surround of the separator 11, over the entire surround. The manifold seal portion 73 is provided around each of the manifold holes 13, over the entire surround. The manifold seal portions 73 include a manifold seal portion 73A for oxygen ($O_2$) supply, a manifold seal portion 73B for oxygen ($O_2$) discharge, a manifold seal portion 73C for hydrogen ($H_2$) supply, a manifold seal portion 73D for hydrogen ($H_2$) discharge, a manifold seal portion 73E for cooling water supply, and a manifold seal portion 73F for cooling water discharge.

Figure 2:
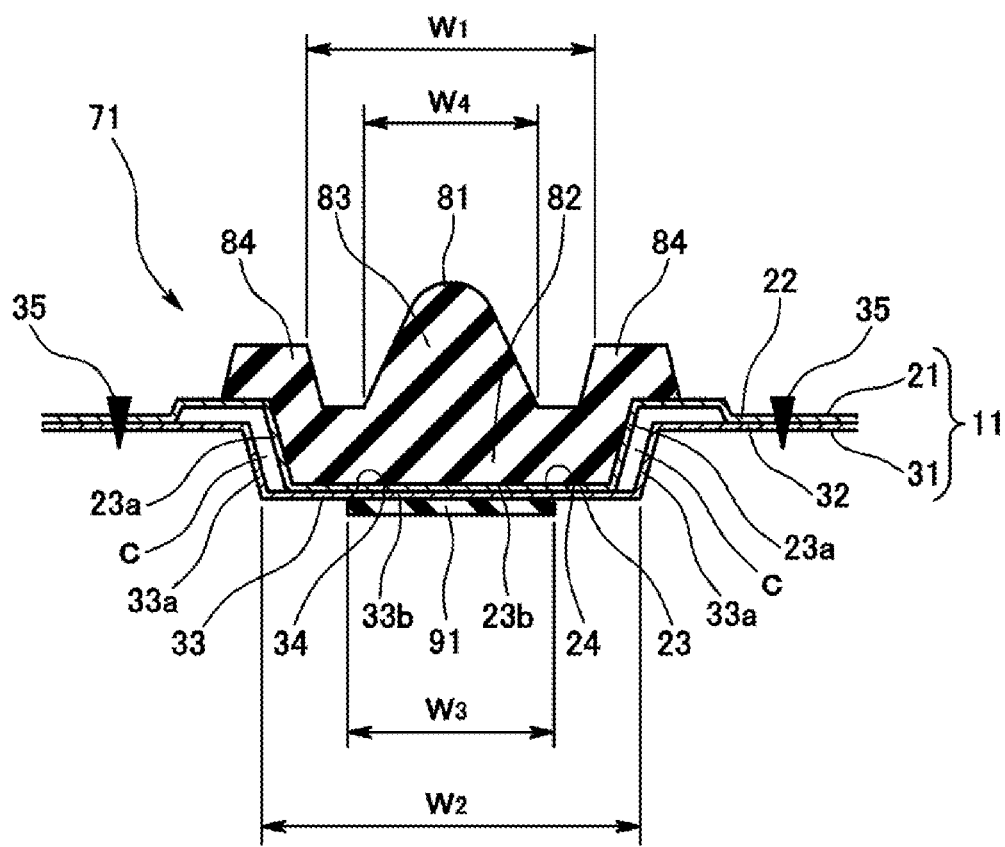
FIG. 2 is an enlarged cross-sectional view taken along the line C-C in FIG. 1.

The separator 11 includes a first separator component 21 and a second separator component 31 as illustrated in FIG. 2. The first separator component 21 is a press-workable metal plate. The second separator component 31 is a press-workable metal plate. The first separator component 21 and the second separator component 31 are joined to each other while superposed over each other in the thickness direction. Thereby, a press-workable metal bipolar separator is formed. The first separator component 21 and the second separator component 31 are joined at joint portions 35.

The following describes configurations of the outer surround seal portion 72 and the manifold seal portions 73. Since the outer surround seal portion 72 and the manifold seal portions 73 have the same cross-sectional shapes, the following describes the outer surround seal portion 72.

The first separator component 21 on an upper side includes a first three-dimensional shape portion 23 as illustrated in FIG. 2. The first three-dimensional shape portion 23 protrudes toward the second separator component 31 on a lower side. The first three-dimensional shape portion 23 is formed by press working. The first three-dimensional shape portion 23 includes a pair of left and right side portions 23a (first side portions) having a tapered-surface shape and a bottom portion 23b (first bottom portion) having a flat shape. The first three-dimensional shape portion 23 has a trapezoidal cross section. The first three-dimensional shape portion 23 includes a back surface facing in a direction opposite to a protruding direction of the first three-dimensional shape portion 23. A gasket attachment groove 24 is formed at the first three-dimensional shape portion 23 so as to be on a side of the back surface (on a side of its upper surface in FIG. 2). The gasket attachment groove 24 holds a lip-shaped gasket 81. The lip-shaped gasket 81 is described below.

The second separator component 31 includes a second three-dimensional shape portion 33. The three-dimensional shape portion 33 protrudes in the same direction as the first three-dimensional shape portion 23 does, while a position of the three-dimensional shape portion 33 is adjusted, on its flat surface, to a position of the first three-dimensional shape portion 23. The second three-dimensional shape portion 33 is formed by press working. The second three-dimensional shape portion 33 includes a pair of left and right side portions 33a (second side portions) having a tapered-surface shape and a bottom portion 33b (second bottom portion) having a flat shape. The second three-dimensional shape portion 33 has a trapezoidal cross section. The second three-dimensional shape portion 33 includes a back surface facing in a direction opposite to a protruding direction of the second three-dimensional shape portion 33. A three-dimensional shape fitting groove 34 is formed at the second three-dimensional shape portion 33 so as to be on a side of the back surface (on a side of its upper surface in FIG. 2). The first three-dimensional shape portion 23 is fitted into and accommodated in the three-dimensional shape fitting groove 34.

The gasket 71 is a double-sided gasket constituted by a combination of the lip-shaped gasket 81 and a flat-shaped gasket 91.

The lip-shaped gasket 81 is held by the gasket attachment groove 24 of the first separator component 21.

The lip-shaped gasket 81 includes a gasket base portion 82, a seal lip 83, and a pair of projection-shaped reception portions 84. The gasket base portion 82, the seal lip 83, and the reception portions 84 are integrated with each other. The gasket base portion 82 has a flat shape, and is held in the attachment groove 24. The seal lip 83 has a mountain-shaped cross section. The seal lip 83 is provided on a flat surface of the gasket base portion 82 and at a width-direction center of the gasket base portion 82. A pair of the reception portions 84 are provided on the flat surface of the gasket base portion 82 and on both sides of the seal lip 83 in the width direction so as to be at an interval from each other. The seal lip 83 includes a distal end having an arc-shaped cross section so as to easily generate peak surface pressure. In contrast to this, the reception portions 84 each include a distal end formed in a flat shape so as to easily exert a receiving function. A height of the reception portion 84 is smaller than a height of the seal lip 83. A pair of the reception portions 84 have heights substantially equal to each other. The interval between a pair of the reception portions 84 is smaller than a width of the second three-dimensional shape portion 33. Specifically, a distance w1 between distal end portions of a pair of the reception portions 84 is smaller than a width w2 of the bottom portion 33b of the second three-dimensional shape portion 33. The lip-shaped gasket 81 is molded by an injection molding method. The lip-shaped gasket 81 is formed of a rubber material such as a silicon-based one, ethylene-propylene-diene monomer (EPDM) rubber, a fluorine-based one, or polyisobutylene (PIB).

The flat-shaped gasket 91 is held on an outer surface side at the bottom portion 33b of the second three-dimensional shape portion 33.

The flat-shaped gasket 91 is formed in a flat shape and in a thin-film shape. A width w3 of the flat-shaped gasket 91 is larger than a width w4 of the seal lip 83. The width w3 of the flat-shaped gasket 91 is smaller than the distance w1 between the distal end portions of a pair of the reception portions 84. The width w3 of the flat-shaped gasket 91 is smaller than the width w2 of the bottom portion 33b of the second three-dimensional shape portion 33. The flat-shaped gasket 91 is formed by applying rubber solution or liquid rubber by screen printing. Alternatively, the flat-shaped gasket 91 may be formed by an inkjet method, a stamping method, or the like. The flat-shaped gasket 91 is formed of a rubber material such as a silicon-based one, EPDM rubber, a fluorine-based one, or PIB.

The first three-dimensional shape portion 23 and the second three-dimensional shape portion 33 are each formed by press working. For this reason, the following configuration is provided against a dimensional error at the time of the press working and positional deviation on the flat surface at the time of joining the separator components to each other.

A width of the first three-dimensional shape portion 23 is smaller than a width of the second three-dimensional shape portion 33. A width of the bottom portion 23b of the first three-dimensional shape portion 23 is smaller than a width of the bottom portion 33b of the second three-dimensional shape portion 33. A width-direction gap c is provided between the side portion 23a of the first three-dimensional shape portion 23 and the side portion 33a of the second three-dimensional shape portion 33 that face each other. Thus, when a dimensional error and positional deviation are within a range of the gap c, the dimensional error and the positional deviation can be absorbed, accordingly enabling the first three-dimensional shape portion 23 to be fitted into the second three-dimensional shape portion 33. The first three-dimensional shape portion 23 is fitted into the three-dimensional shape fitting groove 34, and the first separator component 21 and the second separator component 31 are joined to each other. In this state, the bottom portion 23b of the first three-dimensional shape portion 23 and the bottom portion 33b of the second three-dimensional shape portion 33 are in a state of contacting with each other, and the side portion 23a of the first three-dimensional shape portion 23 and the side portion 33a of the second three-dimensional shape portion 33 are however in a state of being separated from each other without contacting with each other.

The manifold seal portion 73A for oxygen supply supplies oxygen from the supply manifold hole 13A to the reaction surface 12 at the time of an operation of a fuel battery. The manifold seal portion 73B for oxygen discharge discharges the oxygen from the reaction surface 12 to the discharge manifold hole 13B at the time of the operation of the fuel battery.

Figure 4A:
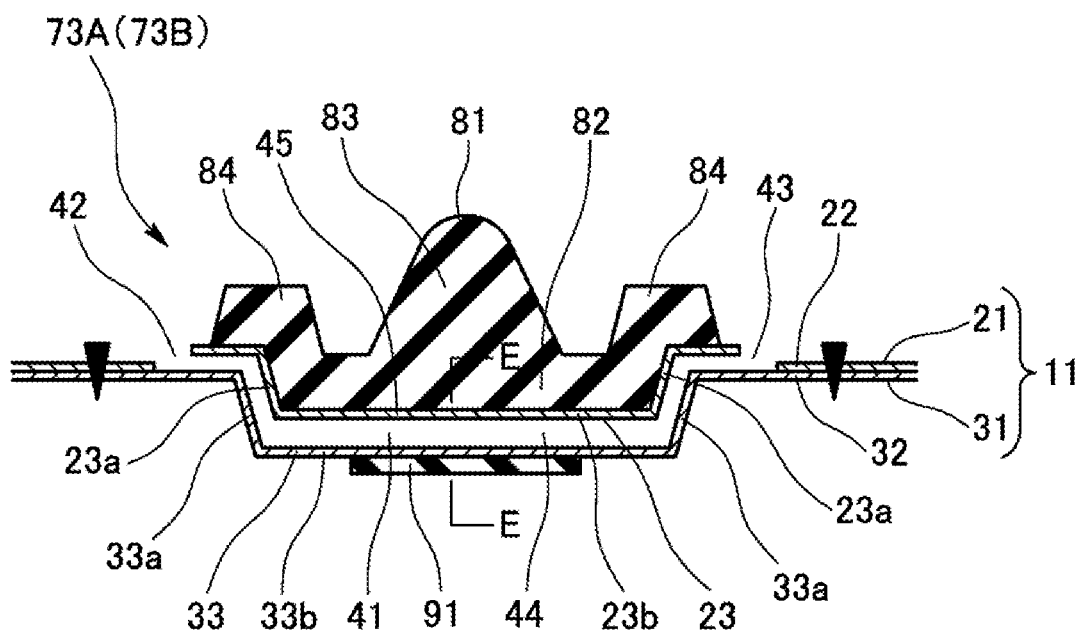
FIG. 4A is an enlarged cross-sectional view taken along the line D-D in FIG. 1.

A gap space 41 is provided at one part on the seal surround and between the first three-dimensional shape portion 23 and the second three-dimensional shape portion 33, as illustrated in FIG. 4A. A first opening 42 and a second opening 43 are provided at the first separator component 21 so as to be at both respective end portions of the gap space 41. Thereby, a fluid flow path 44 is provided. The fluid flow path 44 traverses the lip-shaped gasket 81 and the flat-shaped gasket 91 in the width direction. Oxygen flows through the fluid flow path 44.

Figure 4B:
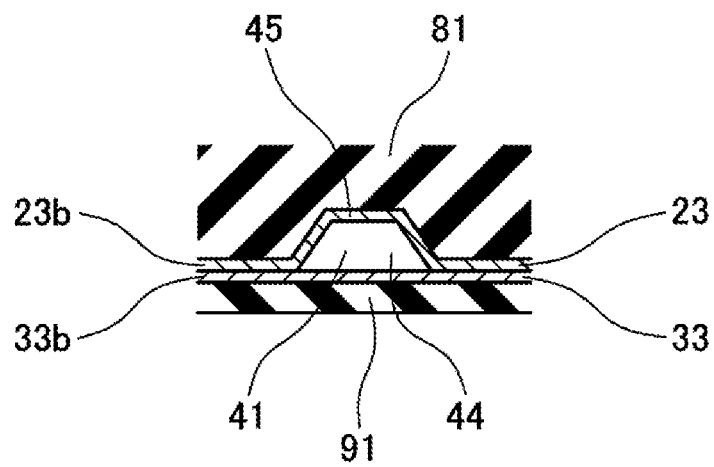
FIG. 4B is a sectional view taken along the line E-E in FIG. 4A.
Figure 5:
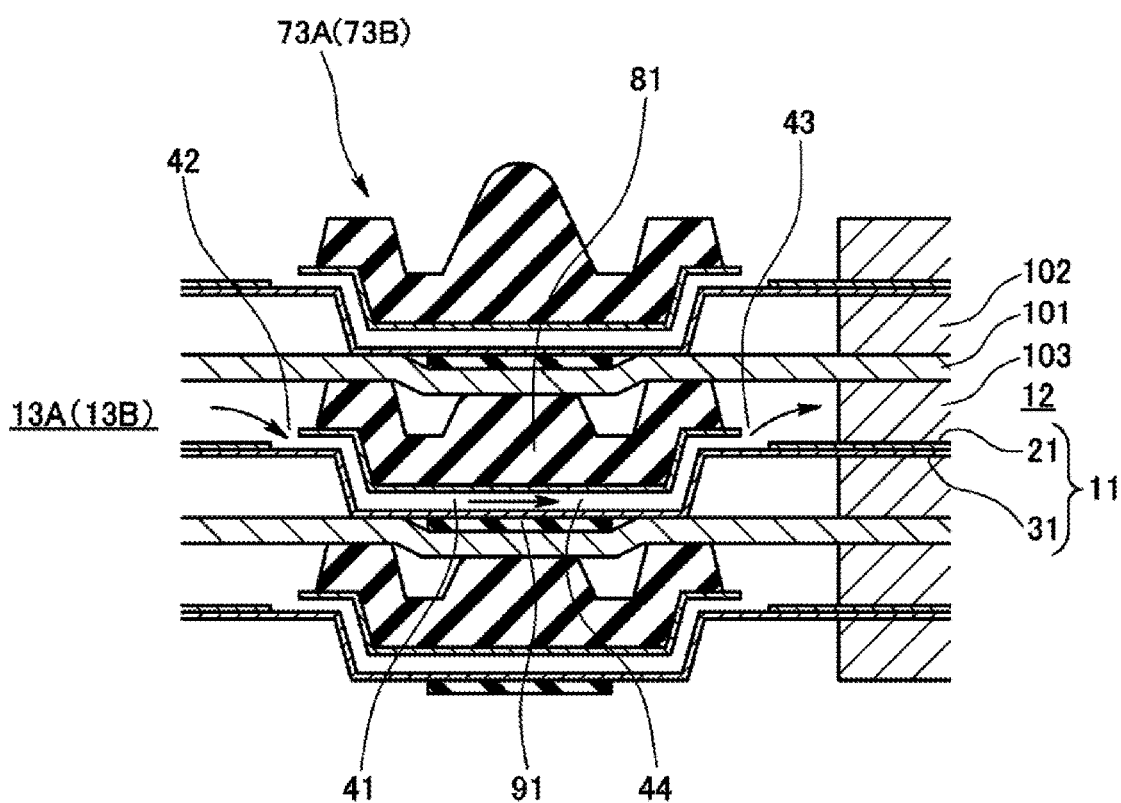
FIG. 5 is an enlarged main-part cross-sectional view illustrating a stack assembled state of the separator-integrated gaskets.

The first three-dimensional shape portion 23 includes a three-dimensional portion 45. The three-dimensional portion 45 is formed by press working. The three-dimensional portion 45 has a sectional shape illustrated in FIG. 4B, in an entire range of the bottom portion 23b, a pair of the side portions 23a, and flat portions 22 so as to traverse in the width direction of the first three-dimensional shape portion 23. The bottom portion 23b and a pair of the side portions 23a constitute the first three-dimensional shape portion 23, and the flat portions 22 are positioned on both sides of the first three-dimensional shape portion 23 in the width-direction. The first three-dimensional shape portion 23 including the three-dimensional portion 45 is fitted into the second three-dimensional shape portion 33 while the bottom portion 23b and the bottom portion 33b are made to contact with each other. Thereby, the gap space 41 becomes a tunnel-shaped space. Thus, a fluid flow path 44 for oxygen supply in the direction of the arrows is formed as illustrated in FIG. 5. This fluid flow path 44 leads from the supply manifold hole 13A to the reaction surface 12 via the first opening 42, the gap space 41, and the second opening 43. Further, a fluid flow path 44 for oxygen discharge in the direction opposite to that of the arrows is formed. This fluid flow path 44 leads from the reaction surface 12 to the discharge manifold hole 13B via the second opening 43, the gap space 41, and the first opening 42.

The manifold seal portion 73C for hydrogen supply supplies hydrogen from the supply manifold hole 13C to the reaction surface 12 at the time of an operation of the fuel battery. The manifold seal portion 73D for hydrogen discharge discharges the hydrogen from the reaction surface 12 to the discharge manifold hole 13D at the time of the operation of the fuel battery.

Figure 6A:
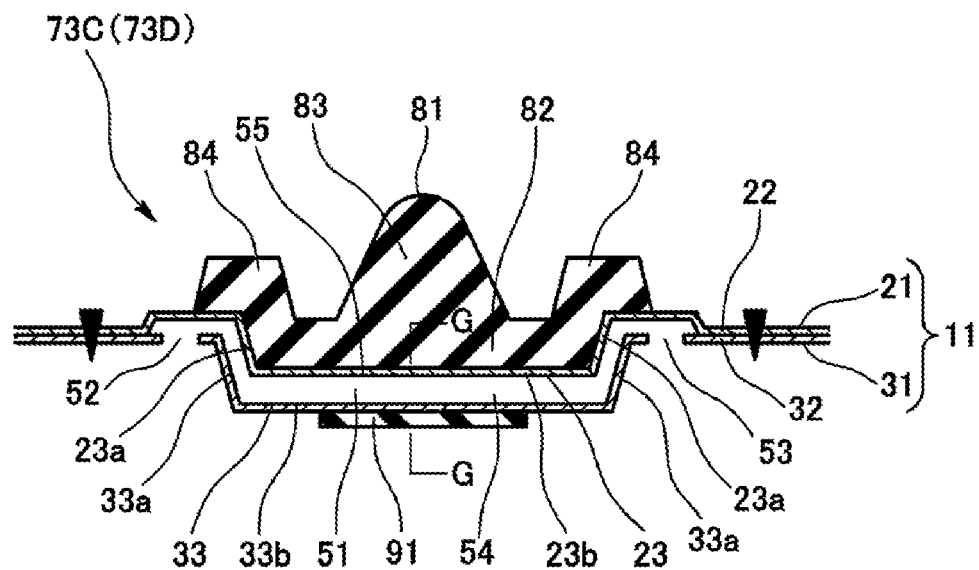
FIG. 6A is an enlarged cross-sectional view taken along the line F-F in FIG. 1.

A gap space 51 is provided at one part on the seal surround and between the first three-dimensional shape portion 23 and the second three-dimensional shape portion 33, as illustrated in FIG. 6A. A first opening 52 and a second opening 53 are provided at the second separator component 31 so as to be at both respective end portions of the gap space 51. Thereby, a fluid flow path 54 is provided. The fluid flow path 54 traverses the lip-shaped gasket 81 and the flat-shaped gasket 91 in the width direction. Hydrogen flows through the fluid flow path 54.

Figure 6B:
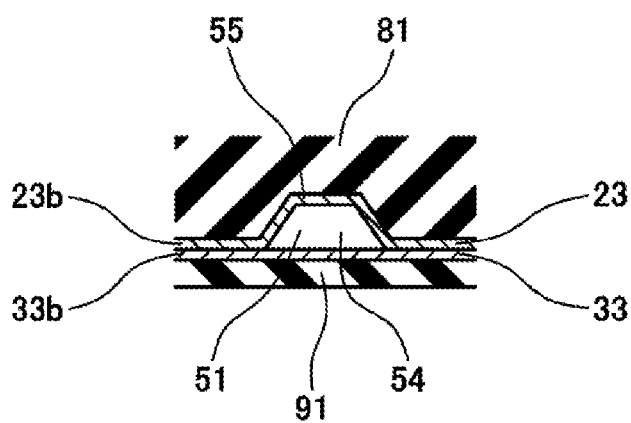
FIG. 6B is a sectional view taken along the line G-G in FIG. 6A.
Figure 7:
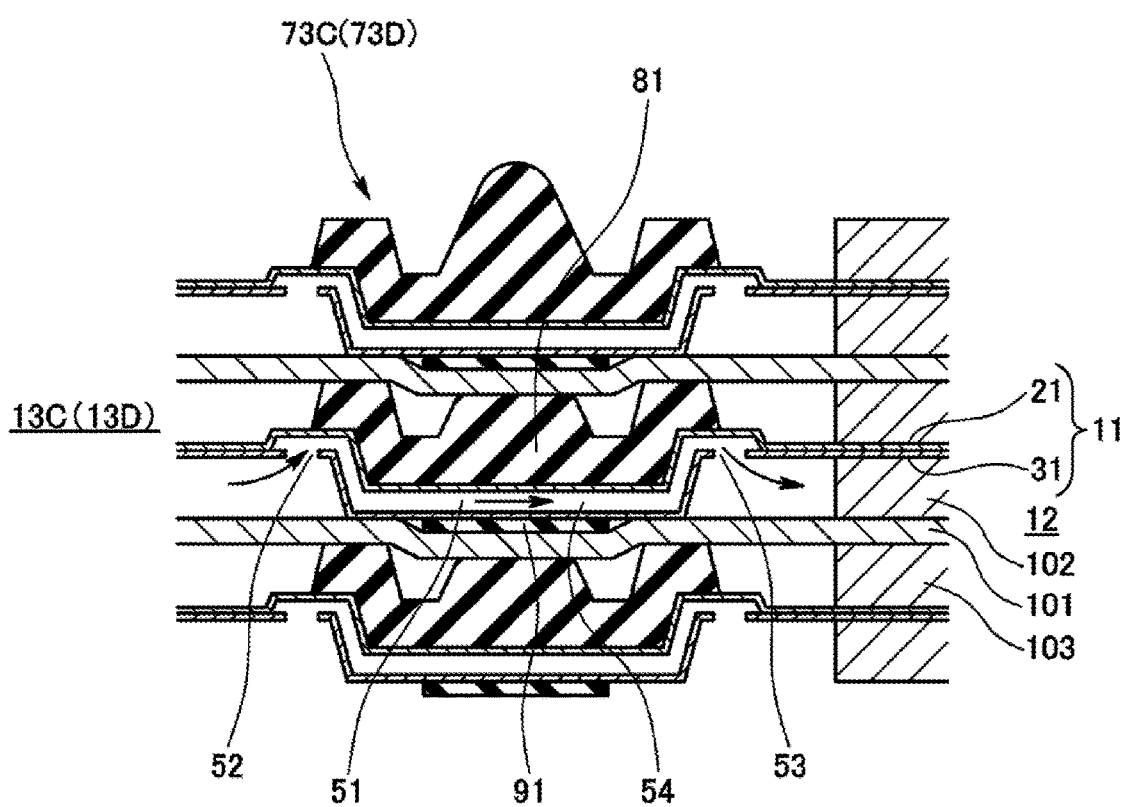
FIG. 7 is an enlarged main-part cross-sectional view illustrating a stack assembled state of the separator-integrated gaskets.

The first three-dimensional shape portion 23 includes a three-dimensional portion 55. The three-dimensional portion 55 is formed by press working. The three-dimensional portion 55 has a sectional shape illustrated in FIG. 6B, in an entire range of the bottom portion 23b, a pair of the side portions 23a, and the flat portions 22 so as to traverse in the width direction of the first three-dimensional shape portion 23. The bottom portion 23b and a pair of the side portions 23a constitute the first three-dimensional shape portion 23, and the flat portions 22 are positioned on both sides of the first three-dimensional shape portion 23 in the width-direction. The first three-dimensional shape portion 23 including the three-dimensional portion 55 is fitted into the second three-dimensional shape portion 33 while the bottom portion 23b and the bottom portion 33b are made to contact with each other. Thereby, the gap space 51 becomes a tunnel-shaped space. Thus, a fluid flow path 54 for hydrogen supply in the direction of the arrows is formed as illustrated in FIG. 7. This fluid flow path 54 leads from the supply manifold hole 13C to the reaction surface 12 via the first opening 52, the gap space 51, and the second opening 53. Further, a fluid flow path 54 for hydrogen discharge in the direction opposite to that of the arrows is formed. This fluid flow path 54 leads from the reaction surface 12 to the discharge manifold hole 13D via the second opening 53, the gap space 51, and the first opening 52.

The manifold seal portion 73E for cooling water supply supplies cooling water from the supply manifold hole 13E to the reaction surface 12 at the time of an operation of the fuel battery. The manifold seal portion 73F for cooling water discharge discharges the cooling water from the reaction surface 12 to the discharge manifold hole 13F at the time of the operation of the fuel battery.

Figure 8A:
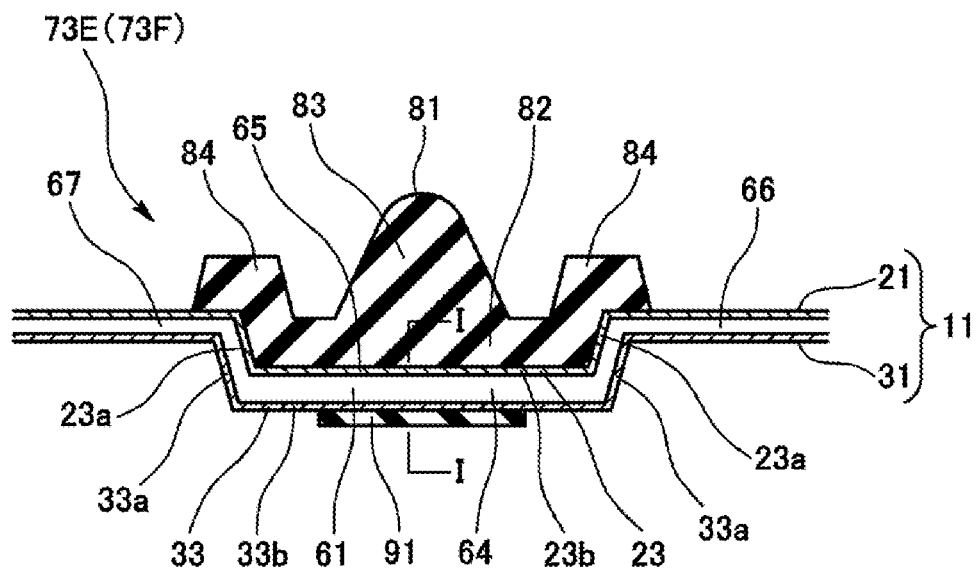
FIG. 8A is an enlarged cross-sectional view taken along the line H-H in FIG. 1.

A gap space 61 is provided at one part on the seal surround and between the first three-dimensional shape portion 23 and the second three-dimensional shape portion 33, as illustrated in FIG. 8A. Thereby, a fluid flow path 64 is provided. The fluid flow path 64 traverses the lip-shaped gasket 81 and the flat-shaped gasket 91 in the width direction. Cooling water flows through the fluid flow path 64.

Figure 8B:
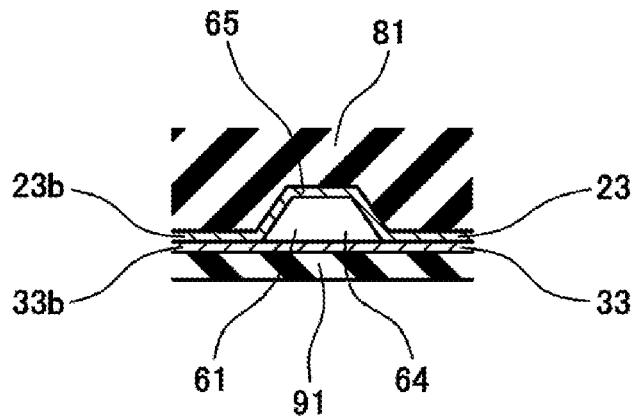
FIG. 8B is a sectional view taken along the line I-I in FIG. 8A.

The first three-dimensional shape portion includes a three-dimensional portion 65. The three-dimensional portion 65 is formed by press working. The three-dimensional portion 65 has a sectional shape illustrated in FIG. 8B, in an entire range of the bottom portion 23$b$, a pair of the side portions 23$a$, and the flat portions 22 so as to traverse in the width direction of the first three-dimensional shape portion 23. The bottom portion 23$b$ and a pair of the side portions 23$a$ constitutes the first three-dimensional shape portion 23, and the flat portions 22 are positioned on both sides of the first three-dimensional shape portion 23 in the width direction. The first three-dimensional shape portion 23 including the three-dimensional portion 65 is fitted into the second three-dimensional shape portion 33 while the bottom portion 23$b$ and the bottom portion 33$b$ are made to contact with each other. Thereby, the gap space 61 becomes a tunnel-shaped space.

Cooling water is not a reactant, differently from oxygen and hydrogen. Accordingly, the cooling water passes through an inside (an inner space between the first separator component 21 and the second separator component 31) of the bipolar separator, also in a region of the reaction surface 12, and thereby flows into the discharge manifold hole 13F. For this reason, an inner space 66 continues from the gap space 61, between the first separator component 21 and the second separator component 31, also in a region closer to the reaction surface 12 than the first three-dimensional shape portion 23 and the second three-dimensional shape portion 33. The inner space 66 has a cross-sectional shape similar to that of the gap space 61

An inner space 67 continues from the gap space 61, between the first separator component 21 and the second separator component 31, also in each of a region of the supply manifold hole 13E and a region of the discharge manifold hole 13F. The inner space 67 has a cross-sectional shape similar to that of the gap space 61.

Figure 9:
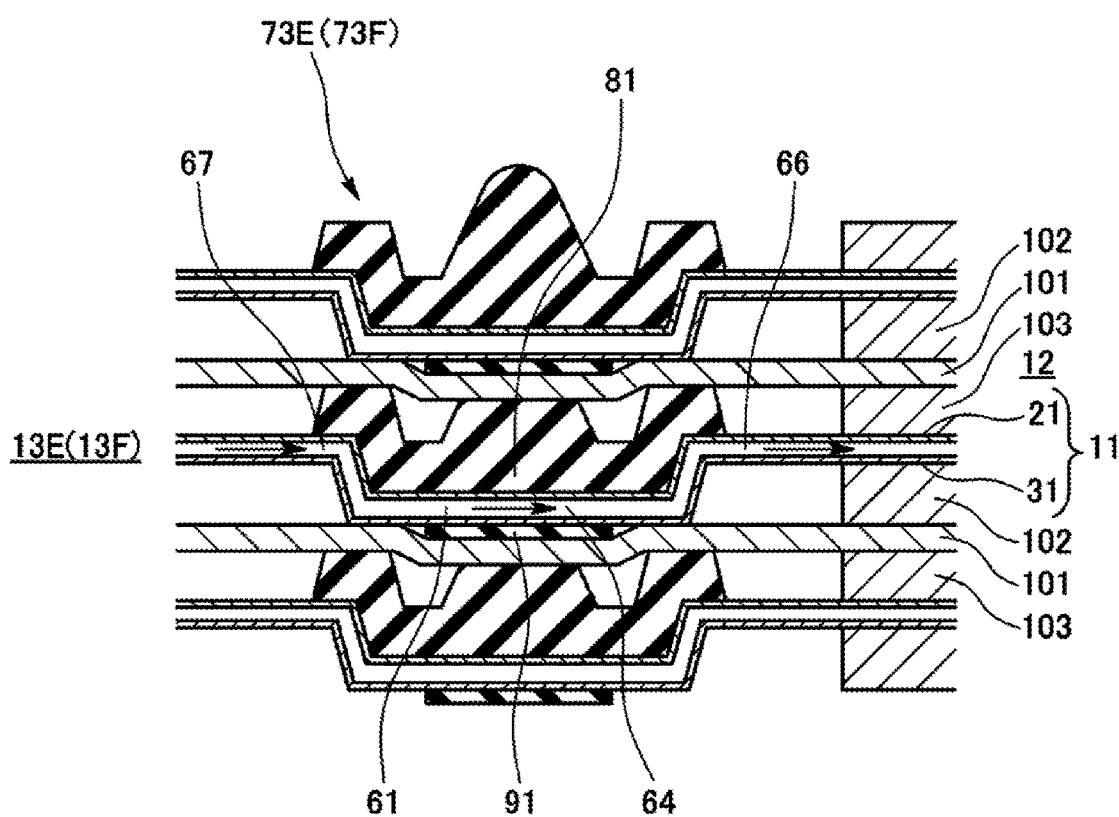
FIG. 9 is an enlarged main-part cross-sectional view illustrating a stack assembled state of the separator-integrated gaskets.

Thereby, the fluid flow path 64 for cooling water supply in the direction of the arrows is formed so as to lead from the supply manifold hole 13E to the inner space 66 via the inner space 67 and the gap space 61, as illustrated in FIG. 9. Further, the fluid flow path 64 for cooling water discharge in the direction opposite to that of the arrows is formed so as to lead from the inner space 66 to the discharge manifold hole 13F via the gap space 61 and the inner space 67.

Figure 10:
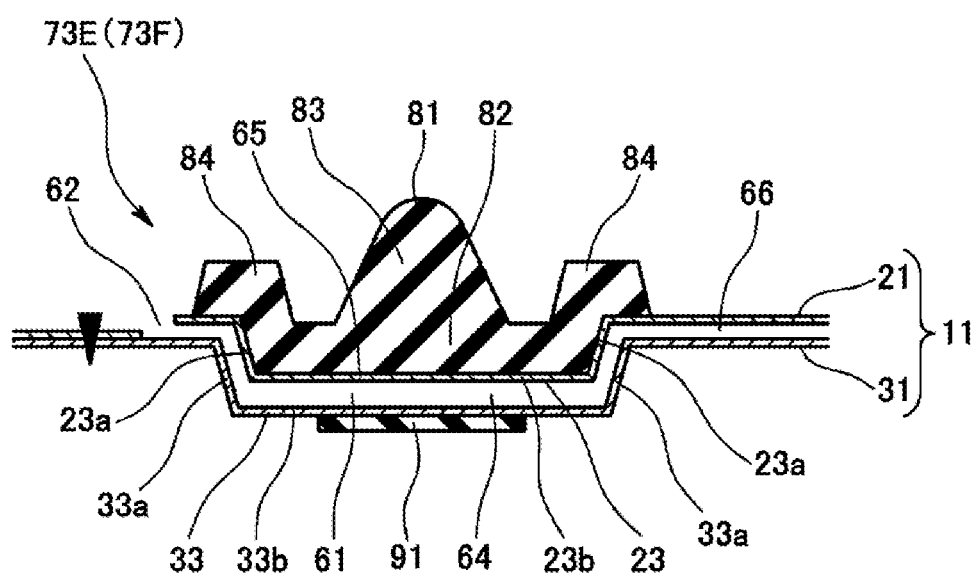
FIG. 10 is an enlarged main-part cross-sectional view illustrating another example of a flow structure of the separator-integrated gasket.
Figure 11:
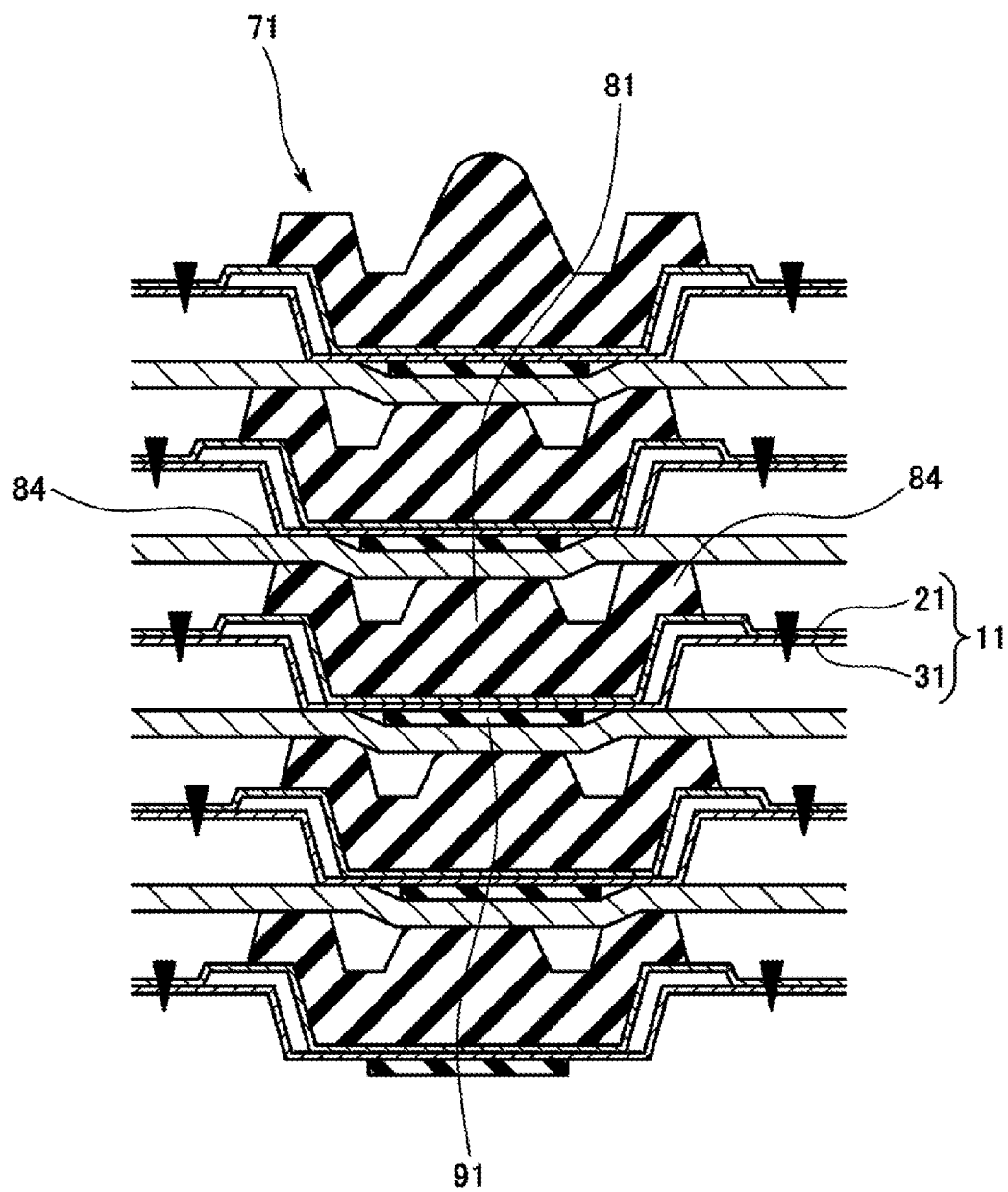
FIG. 11 is an enlarged main-part cross-sectional view illustrating a stack assembled state of the separator-integrated gaskets.

An opening 62 may be provided instead of the inner space 67, as illustrated in FIG. 10, in each of a region of the manifold hole 13E for cooling water supply and a region of the manifold hole 13F for cooling water discharge.

Figure 3:
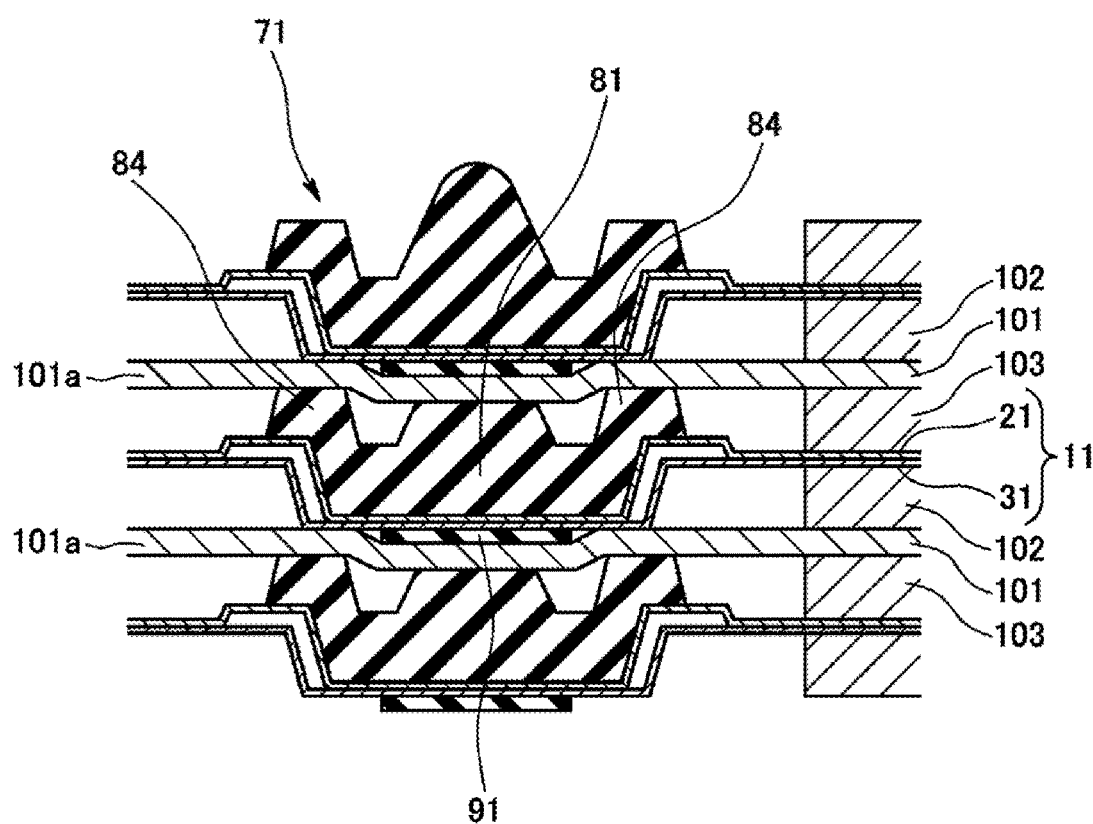
FIG. 3 is an enlarged main-part cross-sectional view illustrating a stack assembled state of the separator-integrated gaskets.

The separator-integrated gaskets 1 according to the present embodiment are assembled as a fuel battery stack together with electrolyte membranes 101 and gas diffusion layers 102, 103, as illustrated in FIG. 3. The electrolyte membrane 101 and the gas diffusion layers 102, 103 are constituent elements of a fuel cell. The electrolyte membrane 101 sandwiched between a pair of the gas diffusion layers 102, 103 has a flat surface area wider than each of the gas diffusion layers 102, 103. Thus, the electrolyte membrane 101 includes a surround edge portion 101$a$ that is on an outer side of the gas diffusion layers 102, 103. The surround edge portion 101$a$ is pinched between the lip-shaped gasket 81 and the flat-shaped gasket 91. Thereby, the lip-shaped gasket 81 and the flat-shaped gasket 91 exert a sealing function so as to prevent leakage of oxygen, hydrogen, or cooling water.

The lip-shaped gasket 81 of the separator-integrated gasket 1 according to the present embodiment includes the gasket base portion 82 and the seal lip 83. The seal lip 83 is provided integrally on the flat surface of the gasket base portion 82. The flat-shaped gasket 91 is a flat one without a seal lip. Accordingly, the lip-shaped gasket 81 has a height (thickness) larger than that of the flat-shaped gasket 91.

Figure 13:
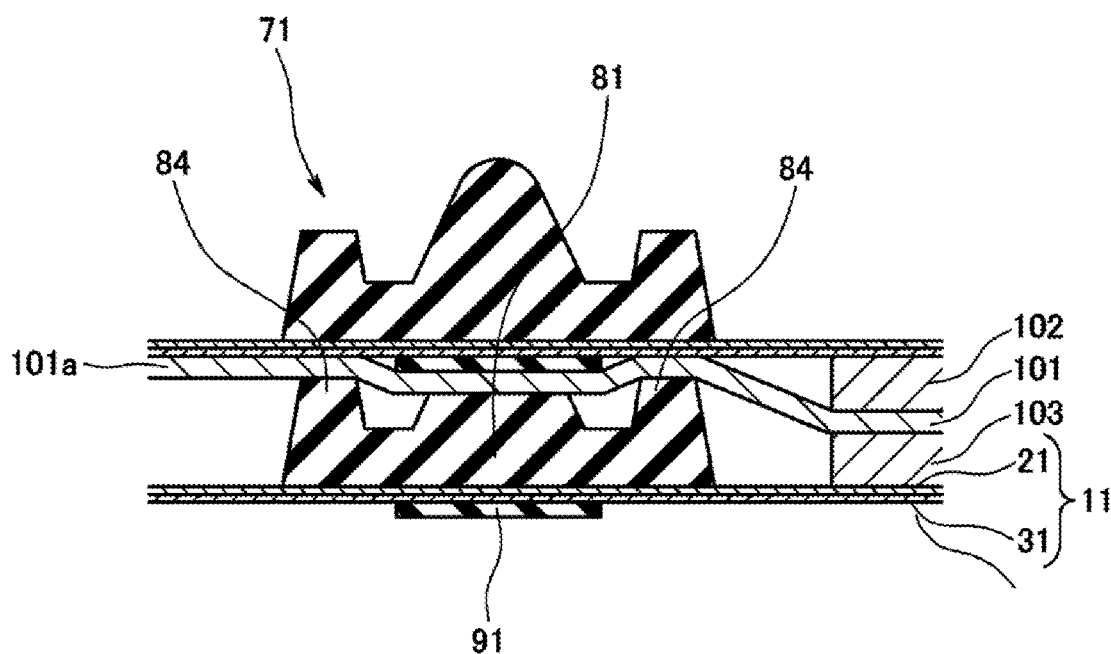
FIG. 13 is an enlarged main-part cross-sectional view illustrating a stack assembled state of separator-integrated gaskets according to a comparative example.

FIG. 13 illustrates a comparative example where neither a first separator component 21 nor a second separator component 31 includes a three-dimensional shape portion, and the first separator component 21 and the second separator component 31 are flat-shaped. In this case, a difference in height (thickness) between the lip-shaped gasket 81 and the flat-shaped gasket 91 causes the surround edge portion 101$a$ of the electrolyte membrane 101 to be lifted to a one side (an upper side in FIG. 13) in the thickness direction by the lip-shaped gasket 81 at the time of stack assembling. The surround edge portion 101$a$ pinched between the lip-shaped gasket 81 and the flat-shaped gasket 91 is thus deformed by an amount depending on such lift.

In contrast to this, the first and second separator components 21, 31 of the separator integrated gasket 1 according to the present embodiment include three-dimensional shape portions 23, 33, respectively. Therefore, the surround edge portion 101$a$ belonging to the electrolyte membrane 101 and pinched between the lip-shaped gasket 81 and the flat-shaped gasket 91 is prevented from being lifted to one side (an upper side in FIG. 3) in the thickness direction by the lip-shaped gasket 81 at the time of stack assembling, as illustrated in FIG. 3. The electrolyte membrane 101 thus remains approximately flat-shaped without being considerably deformed.

Accordingly, the electrolyte membrane 101 can be prevented from being lifted and deformed by the lip-shaped gasket 81. Its durability can be thus prevented from declining.

A height of the three-dimensional shape portion 33 of the second separator component 31 is preferably set to be substantially equal to or approximately substantially equal to a thickness of the gas diffusion layer 102 arranged between the second separator component 31 and the electrolyte membrane 101.

According to the separator-integrated gasket 1 of the present embodiment, the width of the first three-dimensional shape portion 23 is smaller than the width of the second three-dimensional shape portion 33. The width-direction gap c is provided between the side portion 23$a$ of the first three-dimensional shape portion 23 and the side portion 33$a$ of the second three-dimensional shape portion 33 that face each other. Thus, even when dimensional errors occur at the time of press working of the first separator component 21 and the second separator component 31, or positional deviation on the flat surface occurs at the time of joining the first separator component 21 and the second separator component 31 to each other, the first three-dimensional shape portion 23 can be fitted into the second three-dimensional shape portion 33.

The separator-integrated gasket 1 according to the present embodiment is provided with the gap spaces 41, 51, and 61. The gap spaces 41, 51, and 61 are each at one part on the surround and between the bottom portion 23$b$ of the first three-dimensional shape portion 23 and the bottom portion 33b of the second three-dimensional shape portion 33. Thereby, the fluid flow paths 44, 54, and 64 are formed. The fluid flow paths 44, 54, and 64 traverse the lip-shaped gasket 81 and the flat-shaped gasket 91 in the width direction. Reactants ($O_2$ and $H_2$) and cooling water flow via the fluid flow paths 44, 54, and 64, from the supply manifold holes 13A, 13C, and 13E to the reaction surface 12 and from the reaction surface 12 to the discharge manifold holes 13B, 13D, and 13F.

The lip-shaped gasket 81 of the separator-integrated gasket 1 according to the present embodiment is provided with a pair of the projection-shaped reception portions 84. The interval between a pair of the reception portions 84 is smaller than the width of the second three-dimensional shape portion 33. Thus, both of a pair of the reception portions 84 simultaneously support the second three-dimensional shape portion 33 positioned on an upper side of these reception portions 84, as illustrated in FIG. 3. Accordingly, even when partial excessive compression or positional deviation between the separators 11 occurs at the time of stack assembling, the separators 11 can be prevented from being deformed or inclined, and a plurality of the stacked separators 11 can be kept parallel to each other.

Figure 12:
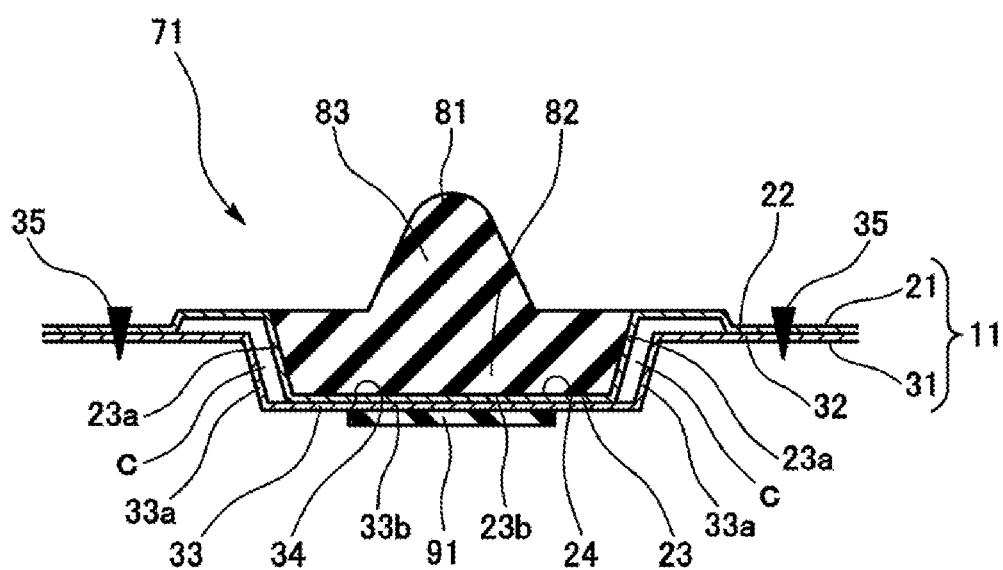
FIG. 12 is a main-part cross-sectional view illustrating a separator-integrated gasket according to another embodiment.

The reception portions 84 may be omitted depending on convenience of product specifications or the like, as illustrated in FIG. 12 of another embodiment.

The invention claimed is:

1. A separator-integrated gasket for a fuel battery, comprising:
a lip-shaped gasket;
a first separator component made of a press-workable metal plate and including a first three-dimensional shape portion, the first separator component including a surface that is on a side opposite to a protruding direction of the first three-dimensional shape portion and on which a gasket attachment groove is formed, the gasket attachment groove holding the lip-shaped gasket;
a second separator component made of a press-workable metal plate and including a second three-dimensional shape portion, the second separator component including a surface that is on a side opposite to a protruding direction of the second three-dimensional shape portion and on which a three-dimensional shape fitting groove is formed, the three-dimensional shape fitting groove accommodating the first three-dimensional shape portion; and
a flat-shaped gasket held on an outer surface side at the second three-dimensional shape portion,
wherein the first three-dimensional shape portion and the second three-dimensional shape portion protrude in a same direction while mutually adjusted in positions on a flat surface, and
the first separator component and the second separator component are joined to each other while superposed over each other in a thickness direction.

2. The separator-integrated gasket according to claim 1, wherein the first three-dimensional shape portion has a width smaller than a width of the second three-dimensional shape portion,
the first three-dimensional shape portion includes a first side portion,
the second three-dimensional shape portion includes a second side portion,
the first side portion and the second side portion face each other, and
a gap is provided between the first side portion and the second side portion.

3. The separator-integrated gasket according to claim 1, wherein the first three-dimensional shape portion includes a first bottom portion,
the second three-dimensional shape portion includes a second bottom portion, and
a fluid flow path is provided at one part on a surround and between the first bottom portion and the second bottom portion, the fluid flow path traversing the lip-shaped gasket and the flat-shaped gasket in a width direction.

4. The separator-integrated gasket according to claim 1, wherein the lip-shaped gasket includes:
a gasket base portion held in the gasket attachment groove;
a seal lip provided on a flat surface of the gasket base portion; and
a pair of projection-shaped reception portions provided on the flat surface of the gasket base portion and on both sides of the seal lip in a width direction,
wherein an interval between the pair of reception portions is smaller than a width of the second three-dimensional shape portion.

5. The separator-integrated gasket according to claim 2, wherein the first three-dimensional shape portion includes a first bottom portion,
the second three-dimensional shape portion includes a second bottom portion, and
a fluid flow path is provided at one part on a surround and between the first bottom portion and the second bottom portion, the fluid flow path traversing the lip-shaped gasket and the flat-shaped gasket in a width direction.

6. The separator-integrated gasket according to claim 2, wherein the lip-shaped gasket includes:
a gasket base portion held in the gasket attachment groove;
a seal lip provided on a flat surface of the gasket base portion; and
a pair of projection-shaped reception portions provided on the flat surface of the gasket base portion and on both sides of the seal lip in a width direction,
wherein an interval between the pair of reception portions is smaller than a width of the second three-dimensional shape portion.

7. The separator-integrated gasket according to claim 3, wherein the lip-shaped gasket includes:
a gasket base portion held in the gasket attachment groove;
a seal lip provided on a flat surface of the gasket base portion; and
a pair of projection-shaped reception portions provided on the flat surface of the gasket base portion and on both sides of the seal lip in a width direction,
wherein an interval between the pair of reception portions is smaller than a width of the second three-dimensional shape portion.

* * * * *